US010164993B2

(12) United States Patent
Warman et al.

(10) Patent No.: US 10,164,993 B2
(45) Date of Patent: Dec. 25, 2018

(54) DISTRIBUTED SPLIT BROWSER CONTENT INSPECTION AND ANALYSIS

(71) Applicant: Amazon Technologies, Inc., Seattle, WA (US)

(72) Inventors: Leon Robert Warman, Aptos, CA (US); Kurt Kufeld, Seattle, WA (US); Peter Sven Vosshall, Bainbridge Island, WA (US); Jesper Mikael Johansson, Redmond, WA (US); Kyle Bradley Peterson, Seattle, WA (US); Peter Frank Hill, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/438,449

(22) Filed: Feb. 21, 2017

(65) Prior Publication Data

US 2017/0163675 A1    Jun. 8, 2017

Related U.S. Application Data

(62) Division of application No. 14/306,141, filed on Jun. 16, 2014, now Pat. No. 9,635,041.

(51) Int. Cl.
*H04L 29/06* (2006.01)
*H04L 12/24* (2006.01)
(Continued)

(52) U.S. Cl.
CPC .......... *H04L 63/1425* (2013.01); *G06F 21/55* (2013.01); *H04L 41/50* (2013.01);
(Continued)

(58) Field of Classification Search
CPC ............. H04L 63/1425; H04L 63/1433; H04L 63/145; H04L 67/02; H04L 67/10
See application file for complete search history.

(56) References Cited

U.S. PATENT DOCUMENTS 5,634,064 A   5/1997  Warnock et al.
5,872,850 A   2/1999  Klein et al.
(Continued)

FOREIGN PATENT DOCUMENTS

WO    WO 2013/003631 A2    1/2013

OTHER PUBLICATIONS

Bango, Rey, "How JS & Ajax work in Opera Mini 4", Nov. 2, 2007, XP055050107, Retrieved from the Internet.
(Continued)

*Primary Examiner* — Dao Q Ho
*Assistant Examiner* — Sher A Khan
(74) *Attorney, Agent, or Firm* — Knobbe, Martens, Olson & Bear LLP

(57) ABSTRACT

Content inspection and analysis are described. A server stores a definition of sets of browser policies. A definition of one or more sets of users is stored. The server stores an association with a respective set of browser policies for the one or more sets of users. A request is received from a client browser associated with a user, wherein the client browser is configured to communicate with the server. The server determines which set of users the user is associated with. The server identifies a first set of browser policies that is associated with the determined set of users and applies the identified first set of browser policies to the request.

17 Claims, 4 Drawing Sheets

(51) Int. Cl.
*G06F 21/55* (2013.01)
*H04L 29/08* (2006.01)

(52) U.S. Cl.
CPC ........ *H04L 63/145* (2013.01); *H04L 63/1416* (2013.01); *H04L 63/1433* (2013.01); *H04L 63/20* (2013.01); *H04L 63/168* (2013.01); *H04L 67/02* (2013.01); *H04L 67/10* (2013.01)

(56) References Cited

U.S. PATENT DOCUMENTS

| | | | |
|---|---|---|---|
| 5,961,593 | A | 10/1999 | Gabber et al. |
| 6,049,812 | A | 4/2000 | Bertram et al. |
| 6,108,637 | A | 8/2000 | Blumenau |
| 6,138,156 | A | 10/2000 | Fletcher et al. |
| 6,195,679 | B1 | 2/2001 | Bauersfeld et al. |
| 6,430,624 | B1 | 8/2002 | Jamtgaard et al. |
| 6,513,061 | B1 | 1/2003 | Ebata et al. |
| 6,549,941 | B1 | 4/2003 | Jaquith et al. |
| 6,560,620 | B1 | 5/2003 | Ching |
| 6,625,624 | B1 | 9/2003 | Chen et al. |
| 6,704,024 | B2 | 3/2004 | Robotham et al. |
| 6,785,864 | B1 | 8/2004 | Te et al. |
| 6,871,236 | B2 | 3/2005 | Fishman et al. |
| 6,944,665 | B2 | 9/2005 | Brown et al. |
| 6,963,850 | B1 | 11/2005 | Bezos et al. |
| 7,003,442 | B1 | 2/2006 | Tsuda |
| 7,051,084 | B1 | 5/2006 | Hayton et al. |
| 7,054,952 | B1 | 5/2006 | Schwerdtfeger et al. |
| 7,085,736 | B2 | 8/2006 | Keezer et al. |
| 7,159,023 | B2 | 1/2007 | Tufts |
| 7,171,478 | B2 | 1/2007 | Lueckhoff et al. |
| 7,191,211 | B2 | 3/2007 | Tuli |
| 7,353,252 | B1 | 4/2008 | Yang et al. |
| 7,373,313 | B1 | 5/2008 | Kahle et al. |
| 7,543,059 | B2 | 6/2009 | Johnson et al. |
| 7,792,944 | B2 | 9/2010 | DeSantis et al. |
| 7,831,582 | B1 | 11/2010 | Scofield et al. |
| 7,849,502 | B1* | 12/2010 | Bloch ............... H04L 29/12066 726/11 |
| 7,975,000 | B2* | 7/2011 | Dixon .................... G06Q 30/02 705/14.41 |
| 7,996,912 | B2 | 8/2011 | Spalink et al. |
| 8,010,545 | B2 | 8/2011 | Stefik et al. |
| 8,015,496 | B1 | 9/2011 | Rogers |
| 8,060,463 | B1 | 11/2011 | Spiegel |
| 8,073,850 | B1 | 12/2011 | Hubbard et al. |
| 8,103,742 | B1 | 1/2012 | Green |
| 8,185,621 | B2 | 5/2012 | Kasha |
| 8,249,904 | B1 | 8/2012 | DeSantis et al. |
| 8,271,887 | B2 | 9/2012 | Offer et al. |
| 8,316,124 | B1 | 11/2012 | Baumback et al. |
| 8,336,049 | B2 | 12/2012 | Medovich |
| 8,347,349 | B1* | 1/2013 | Wilson ................ G06F 21/6218 380/277 |
| 8,364,811 | B1* | 1/2013 | Erdmann .............. G06F 21/552 706/23 |
| 8,578,499 | B1* | 11/2013 | Zhu ..................... G06F 21/567 713/154 |
| 8,838,570 | B1* | 9/2014 | English .............. H04L 63/1408 707/709 |
| 8,850,049 | B1 | 9/2014 | Qureshi |
| 9,032,516 | B2* | 5/2015 | Kim ..................... G06F 21/566 726/22 |
| 9,178,904 | B1 | 11/2015 | Gangadharan |
| 9,313,100 | B1 | 4/2016 | Jenkins et al. |
| 2001/0036182 | A1 | 11/2001 | Addante |
| 2001/0039490 | A1 | 11/2001 | Verbitsky et al. |
| 2002/0022967 | A1* | 2/2002 | Ohkado ................. G06Q 10/08 705/26.1 |
| 2002/0030703 | A1 | 3/2002 | Robertson et al. |
| 2002/0144131 | A1* | 10/2002 | Spacey ................ H04L 63/083 713/189 |
| 2002/0194302 | A1 | 12/2002 | Blumberg |
| 2003/0023712 | A1 | 1/2003 | Zhao et al. |
| 2003/0041106 | A1 | 2/2003 | Tuli |
| 2003/0208570 | A1 | 11/2003 | Lapidous |
| 2004/0012627 | A1* | 1/2004 | Zakharia .......... G06F 17/30905 715/744 |
| 2004/0083294 | A1 | 4/2004 | Lewis |
| 2004/0139208 | A1 | 7/2004 | Tuli |
| 2004/0181613 | A1 | 9/2004 | Hashimoto et al. |
| 2004/0205448 | A1 | 10/2004 | Grefenstette et al. |
| 2004/0220905 | A1 | 11/2004 | Chen et al. |
| 2004/0243622 | A1 | 12/2004 | Morisawa |
| 2005/0010863 | A1 | 1/2005 | Zemik |
| 2005/0060643 | A1 | 3/2005 | Glass et al. |
| 2005/0086499 | A1* | 4/2005 | Hoefelmeyer ........ H04L 63/145 713/188 |
| 2005/0138382 | A1 | 6/2005 | Hougaard et al. |
| 2005/0183039 | A1 | 8/2005 | Revis |
| 2005/0204276 | A1 | 9/2005 | Hosea et al. |
| 2005/0283833 | A1 | 12/2005 | Lalonde |
| 2006/0085766 | A1 | 4/2006 | Dominowska et al. |
| 2006/0095336 | A1 | 5/2006 | Heckerman et al. |
| 2006/0122889 | A1 | 6/2006 | Burdick et al. |
| 2006/0168510 | A1 | 7/2006 | Bryar et al. |
| 2006/0184421 | A1 | 8/2006 | Lipsky et al. |
| 2006/0206571 | A1* | 9/2006 | Kuwahara ............... H04L 51/12 709/206 |
| 2006/0246193 | A1 | 11/2006 | Karwowski et al. |
| 2006/0248442 | A1 | 11/2006 | Rosenstein et al. |
| 2006/0253581 | A1* | 11/2006 | Dixon ............... G06F 17/30861 709/225 |
| 2006/0277167 | A1 | 12/2006 | Gross et al. |
| 2006/0294461 | A1 | 12/2006 | Nadamoto et al. |
| 2007/0011724 | A1* | 1/2007 | Gonzalez ............... G06F 21/31 726/4 |
| 2007/0022072 | A1 | 1/2007 | Kao et al. |
| 2007/0027672 | A1 | 2/2007 | Decary et al. |
| 2007/0094241 | A1 | 4/2007 | Blackwell et al. |
| 2007/0124693 | A1 | 5/2007 | Dominowska et al. |
| 2007/0136579 | A1 | 6/2007 | Levy |
| 2007/0139430 | A1 | 6/2007 | Korn et al. |
| 2007/0174915 | A1* | 7/2007 | Gribble .................... G06F 21/53 726/24 |
| 2007/0240160 | A1 | 10/2007 | Paterson-Jones et al. |
| 2007/0288589 | A1 | 12/2007 | Chen et al. |
| 2008/0028334 | A1 | 1/2008 | De Mes |
| 2008/0028469 | A1* | 1/2008 | Repasi .................. G06F 21/554 726/24 |
| 2008/0104502 | A1 | 5/2008 | Olston |
| 2008/0140820 | A1 | 6/2008 | Snyder |
| 2008/0183672 | A1 | 7/2008 | Canon et al. |
| 2008/0183889 | A1 | 7/2008 | Andreev et al. |
| 2008/0184128 | A1 | 7/2008 | Swenson et al. |
| 2008/0222299 | A1 | 9/2008 | Boodaei |
| 2008/0282338 | A1* | 11/2008 | Beer ..................... G06F 21/566 726/12 |
| 2008/0320225 | A1 | 12/2008 | Panzer et al. |
| 2009/0012969 | A1 | 1/2009 | Rail et al. |
| 2009/0106664 | A1 | 4/2009 | Corrao |
| 2009/0164924 | A1 | 6/2009 | Flake et al. |
| 2009/0204478 | A1 | 8/2009 | Kalb et al. |
| 2009/0217199 | A1 | 8/2009 | Hara et al. |
| 2009/0248680 | A1 | 10/2009 | Kalavade |
| 2009/0254867 | A1 | 10/2009 | Farouki et al. |
| 2009/0282021 | A1 | 11/2009 | Bennett |
| 2009/0282483 | A1* | 11/2009 | Bennett ............... H04L 63/1416 726/23 |
| 2009/0287653 | A1* | 11/2009 | Bennett ............ G06F 17/30864 |
| 2009/0287698 | A1 | 11/2009 | Marmaros et al. |
| 2009/0327914 | A1 | 12/2009 | Adar et al. |
| 2010/0036740 | A1 | 2/2010 | Barashi |
| 2010/0057639 | A1 | 3/2010 | Schwarz et al. |
| 2010/0077444 | A1 | 3/2010 | Forristal |
| 2010/0115615 | A1* | 5/2010 | Hubbard ........... G06F 17/30864 726/22 |
| 2010/0125507 | A1 | 5/2010 | Tarantino, III et al. |
| 2010/0131594 | A1 | 5/2010 | Kashimoto |
| 2010/0138293 | A1 | 6/2010 | Ramer et al. |
| 2010/0138534 | A1 | 6/2010 | Mutnuru et al. |
| 2010/0218106 | A1 | 8/2010 | Chen et al. |

(56) References Cited

U.S. PATENT DOCUMENTS

| | | | |
|---|---|---|---|
| 2010/0293190 A1 | 11/2010 | Kaiser et al. | |
| 2010/0312788 A1 | 12/2010 | Bailey | |
| 2010/0318892 A1 | 12/2010 | Teevan et al. | |
| 2010/0332513 A1 | 12/2010 | Azar et al. | |
| 2011/0016533 A1* | 1/2011 | Zeigler | G06Q 30/00 726/26 |
| 2011/0022957 A1 | 1/2011 | Lee | |
| 2011/0029854 A1 | 2/2011 | Nashi et al. | |
| 2011/0055203 A1 | 3/2011 | Gutt et al. | |
| 2011/0078140 A1 | 3/2011 | Dube et al. | |
| 2011/0078705 A1 | 3/2011 | Maclinovsky et al. | |
| 2011/0119661 A1 | 5/2011 | Agrawal et al. | |
| 2011/0161849 A1 | 6/2011 | Stallings et al. | |
| 2011/0173177 A1 | 7/2011 | Junqueira et al. | |
| 2011/0173637 A1 | 7/2011 | Brandwine et al. | |
| 2011/0178868 A1 | 7/2011 | Garg et al. | |
| 2011/0185025 A1 | 7/2011 | Cherukuri et al. | |
| 2011/0191327 A1 | 8/2011 | Lee | |
| 2011/0197121 A1 | 8/2011 | Kletter | |
| 2011/0231555 A1 | 9/2011 | Ebrahimi et al. | |
| 2011/0239300 A1* | 9/2011 | Klein | G06F 21/565 726/23 |
| 2011/0246873 A1 | 10/2011 | Tolle et al. | |
| 2011/0289074 A1 | 11/2011 | Leban | |
| 2011/0296341 A1 | 12/2011 | Koppert | |
| 2011/0302510 A1 | 12/2011 | Harrison et al. | |
| 2012/0072821 A1 | 3/2012 | Bowling | |
| 2012/0079596 A1* | 3/2012 | Thomas | G06F 21/55 726/24 |
| 2012/0084644 A1 | 4/2012 | Robert et al. | |
| 2012/0096365 A1 | 4/2012 | Wilkinson et al. | |
| 2012/0110017 A1 | 5/2012 | Gu et al. | |
| 2012/0137201 A1 | 5/2012 | White et al. | |
| 2012/0143944 A1 | 6/2012 | Reeves et al. | |
| 2012/0150844 A1 | 6/2012 | Lindahl et al. | |
| 2012/0166922 A1 | 6/2012 | Rolles | |
| 2012/0180126 A1* | 7/2012 | Liu | G06F 11/3013 726/22 |
| 2012/0198516 A1 | 8/2012 | Lim | |
| 2012/0215834 A1 | 8/2012 | Chen et al. | |
| 2012/0215919 A1 | 8/2012 | Labat et al. | |
| 2012/0272317 A1* | 10/2012 | Rubin | G06F 21/552 726/23 |
| 2012/0284629 A1 | 11/2012 | Peters et al. | |
| 2012/0317295 A1* | 12/2012 | Baird | H04L 67/38 709/228 |
| 2012/0331406 A1 | 12/2012 | Baird et al. | |
| 2013/0007101 A1 | 1/2013 | Trahan et al. | |
| 2013/0007102 A1 | 1/2013 | Trahan et al. | |
| 2013/0014260 A1* | 1/2013 | Lee | G06F 21/567 726/24 |
| 2013/0031461 A1 | 1/2013 | Hou et al. | |
| 2013/0080420 A1 | 3/2013 | Taylor | |
| 2013/0080611 A1 | 3/2013 | Li et al. | |
| 2014/0059649 A1* | 2/2014 | Hu | H04L 63/08 726/3 |
| 2014/0156732 A1 | 6/2014 | Lanni | |

OTHER PUBLICATIONS

Baumann, A., et al., Enhancing STEM Classes Using Weave: A Collaborative Web-Based Visualization Environment, Integrated Stem Education Conference, Apr. 2, 2011, Ewing, New Jersey, pp. 2A-1-2A-4.

Brinkmann, M., "Record and Share your browser history with Hooeey," ghacks.net, Feb. 26, 2008, 6 pages, printed on Jan. 25, 2013.

Chen, H., et al., "Bringing Order to the Web: Automatically Categorizing Search Results," Proceedings of the SIGCHI Conference on Human Factors in Computing Systems, Apr. 1-6, 2000, pp. 145-152.

Close 'n' Forget Firefox add on, Evilfantasy's blog, http://evilfantasy.wordpress.com/2009/03/24/close-%E2%80%98n%E2%80%99-forget-firefox-add-on/, retrieved Mar. 24, 2009, 1 page.

Considine, A., "The Footprints of Web Feet," The New York Times, Mar. 4, 2011, 3 pages, printed on Jan. 25, 2013.

De Carvalho, L.G., et al., Synchronizing Web Browsing Data With Browserver, Proceedings of the IEEE Symposium on Computers and Communications, Jun. 22-25, 2010, Riccione, Italy, pp. 738-743.

EyeBrowse: Record, Visualize and Share your Browser History, Information Aesthetics, Sep. 18, 2009, 2 pages, printed on Jan. 25, 2013.

Feuerstein, Adam, "Flyswat Takes Aim," San Francisco Business Times, printed from http://www.bizjournals.com/sanfrancisco/stories/1999/10/25/story2.html?t=printable, Oct. 22, 1999, 2 pages.

Gabber, et al., "How to Make Personalized Web Browsing Simple, Secure, and Anonymous," Financial Cryptography, 16 pages (1997).

Gingerich, Jason, "Keycorp Making Site Into Portal," KRTBN Knight-Ridder Tribune Business News (South Bend Tribune, Indiana), Oct. 25, 1999, 2 pages.

Hopper, D. Ian, "Desktops Now Have Power to Comparison-Shop," Oct. 18, 1999, printed from http://www.cnn.com/TECH/computing/9910/18/r.u.sure/index.html, 3 pages.

Rao, H.C.-H., et al., "A Proxy-Based Personal Web Archiving Service," Operating Systems Review, 35(1):61-72, 2001.

Teevan, J., et al., "Changing How People View Changes on the Web," 2009, Proceedings of the 22$^{nd}$ Annual ACM Symposium on User Interface Software and Technology, New York, 2009, pp. 237-246.

Van Kleek, M., Introducing "Eyebrowse"—Track and share your web browsing in real time, Haystack Blog, Aug. 28, 2009, 3 pages, printed on Jan. 25, 2013.

Web page titled "RSS Ticker: Add-ons for Firefox," https://addons.mozilla.org/en-US/firefox/addon/rss-ticker/, 3 printed pages, printed on Feb. 7, 2013.

Web page titled "What Internet Users Do on a Typical Day, Trend Data (Adults), Pew Internet & American Life Project," printed from http://pewinternet.org/Static-Pages/Trend-Data-(Adults)/Online-Activities-Daily.aspx on Nov. 29, 2012, 4 pages.

* cited by examiner

DISTRIBUTED SPLIT BROWSER CONTENT INSPECTION AND ANALYSIS

BACKGROUND

Web browsers are ubiquitously employed by users to access content, such as Web pages and files, over the Internet. However, there is a significant amount of harmful content on the Web. For example, malware, such as viruses or worms, may be installed on a user's computer as a result of the user accessing an infected website or downloading a file using a browser. Further, certain websites may be phishing websites that masquerade as a trustworthy entity, and attempt to collect valuable information, such as passwords and financial data, from users for malicious purposes.

Thus, the browser is a key entry point for malicious software. Although many modern browsers include security features which may be user-enabled, browser users are typically unsophisticated and do not make adequate use of such security features or actually disable certain security features in order to make browsing simpler.

The risks posed by Web browsers are dramatically increased in an enterprise environment, where computer resources are shared and networked together. For example, malware downloaded via one user's browser can self-replicate and spread to different network resources in the enterprise.

Conventionally, information technology (IT) administrators in an enterprise have not had an adequate way to manage the security aspects, options, and policies of user browsers. Typically an IT administrator needs to separately manage each browser installation on enterprise computers. Such an approach is time consuming and subject to errors and lapses.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
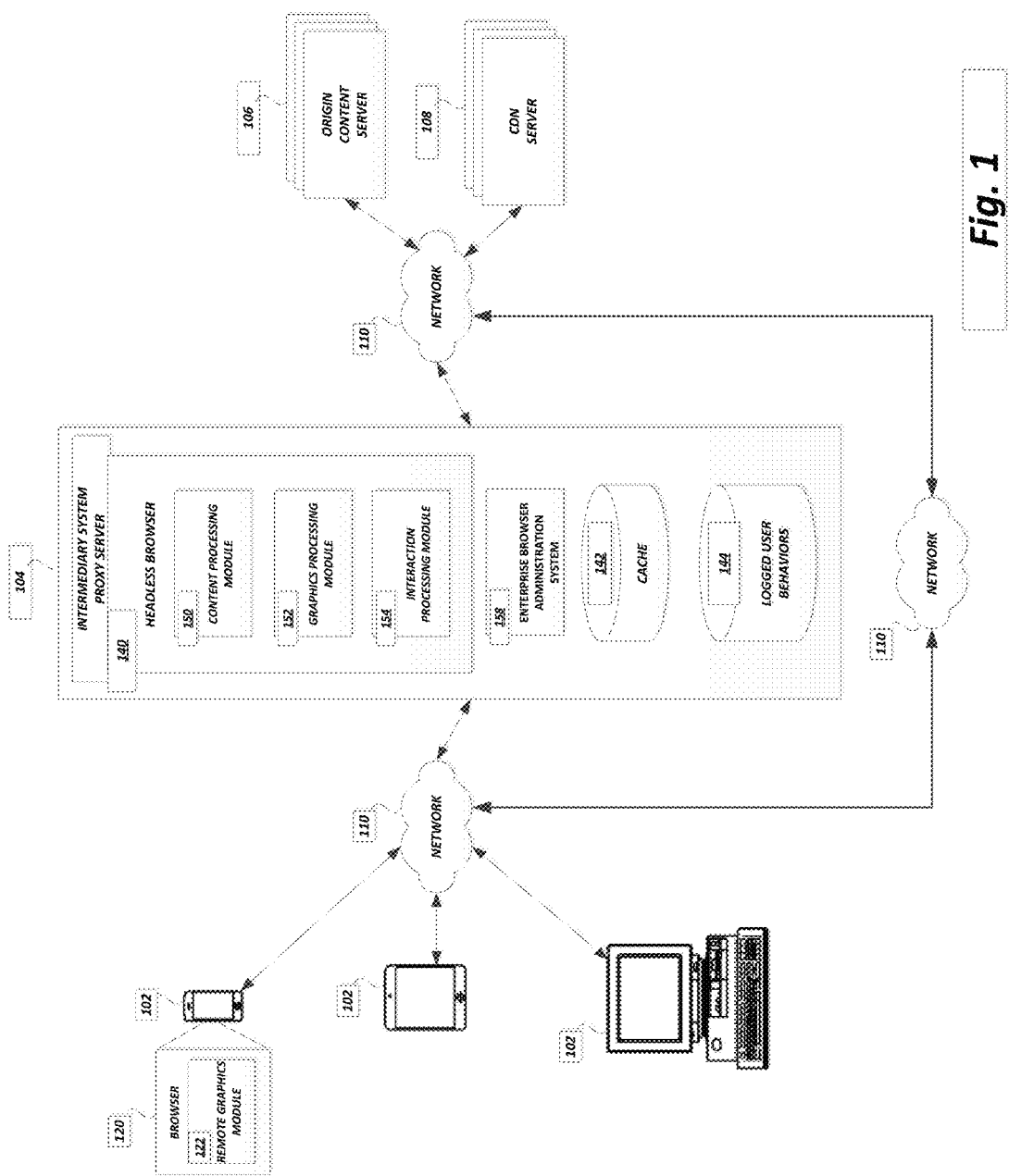
FIG. 1 illustrates an intermediary system that enables enterprise browsing management according to one embodiment.

Processes and systems for enterprise browsing management are described herein.

Although aspects of the embodiments described in the disclosure will focus, for the purpose of illustration, on the management of anonymized browsing using a remote browse session, one skilled in the art will appreciate that the techniques disclosed herein may be applied to any number of software processes or applications. Further, although various aspects of the disclosure will be described with regard to illustrative examples and embodiments, one skilled in the art will appreciate that the disclosed embodiments and examples should not be construed as limiting.

As described above, browsers may act as a conduit via which malware and phishing attacks may be conducted. Certain types of malware may infect large portions of an enterprise, including servers, desktop computers and portable computers. Conventionally, it has proven challenging for IT administrators to manage the numerous browser installations across an enterprise on a user machine by user machine basis so as to prevent or reduce the chances of malware infecting enterprise nodes. In addition, it has proven challenging to conventionally manage options of user browsers.

Accordingly, an enterprise browser administration system is described herein, some embodiments of which address some or all of the deficiencies of conventional techniques noted above. A browser architecture may be used, wherein certain browser processes and functions are executed locally (e.g., on a user device, such as a user's computing device hosting the browser) and certain processes and functions are executed on a remote system, which may act as an intermediary system between the browser hosted on the user device and content provider systems. Such a configuration is sometimes referred to as a split browser. By way of illustration, in an example embodiment, for a given webpage requested by a browser hosted on the user device, the split browser system may dynamically determine which browser processes (e.g., networking, HTML processing, page rendering, etc.) are to be run locally on the user device and which browser processes to run remotely on the intermediary system (which may include one or more proxy servers).

For example, the remote intermediary system may access network resources from third party content providers and may also pre-render (e.g., using a headless browser) portions or all of the requested network resources (e.g., webpages) to facilitate display on certain types of devices, such as tablets and smartphones or other computing devices. The remote, intermediary system can then transmit the pre-rendered portions to the user device and/or transmit graphics painting commands so that the browser on the user device does not have to execute the corresponding HTML code or the like. By controlling what processes are executed on the intermediary system, and by controlling security settings with respect to such processes, IT personnel can centrally manage through a common access point browsers associated with sets of users, user types, and user devices, and protect the enterprise and individual enterprise components against malware and other types of malicious exploitations. Further, utilizing a split browser architecture enables browser-related options and policies to be centrally managed. Thus, certain embodiments obviate or reduce the need to manage user browsers on a user machine by user machine basis.

For example, IT personnel can define, and store in memory, rules, browser configurations, and/or browser settings for individual users, individual user devices, or for specified sets of users and/or sets of user devices. By way of illustration, IT personnel can specify some or all of the following examples:

which sites may or may not be accessed (via sets of blacklisted (not permitted) sites or top level domains, and/or via whitelisted (permitted) sites or top level domains; using pattern matching with dynamic content to determine if the dynamic content may be malicious, etc.);

which users or user types are to be blocked from accessing sites external to the enterprise (e.g., users having access to sensitive customer information, such as credit card information or passwords, may be blocked from having access to the Internet);

Internet access restrictions based on what application is being currently used by a user (e.g., if a user is utilizing an application having access to sensitive customer information, then user access of the Internet is to be blocked);

what is the criteria to be used in determining whether a site may or may not be visited (e.g., where the criteria may include length of a site's existence, whether site name an obvious misspelling of a popular website's URL, whether the domain name an irregular spelling, whether a site has recently changed domain name registrars, etc.);

what types of SSL or TLS communications may be sent;

whether sites registered with specified domain name registrars may be visited;

whether sites with untrusted certificates may be visited;

whether or not browser redirects are to be permitted;

which sites and/or types of sites may or may not store cookies or other tracking data on a user device;

which files and types of files may be downloaded;

which links and which types of links may be activated by a user;

whether or not pop-ups are to be permitted;

whether or not fonts may be downloaded;

whether or not data sources may be accessed across domains;

what types of content may be displayed;

whether or not navigation tracking is to be permitted;

whether or not browser plug-ins/add-ins are permitted;

whether or not unsigned controls (e.g., ActiveX controls) are to be downloaded;

what types of scripts are permitted to be executed;

whether or not programs and files may be launched in an FRAME;

whether or not user data is to be persisted;

whether or not automatic logon for sites is to be permitted;

whether or not browser meta refresh is to be enabled or disabled;

what types of files the user may upload to a third party system;

what types of warning prompts are to be provided to a user when attempting to navigate to a potentially risky site or attempting to download potentially unsafe content;

what types of certificates are to be used for encrypted connections and identification;

whether or not autocomplete of web forms is to be permitted;

what browser toolbars or toolbar selections are to be enabled and/or displayed to the user;

how to handle certificate address mismatches;

what browser settings a browser user may modify or override;

whether browser extensions are to be enabled or disabled;

whether or not the user is permitted to install a non-split browser;

etc.

The enterprise browser administration system may access one or more of such rules, browser configurations, and/or browser settings in determining how to configure a given set of browsers, how to process requests from such browsers, in determining what content is to be provided to such browsers, and/or in determining what actions such browsers may take with respect to returned content, by way of example.

One or more administrative user interfaces may be provided (e.g., via a Web service application programming interface) via which IT personnel (or other authorized person) can define rules, browser configurations, and/or browser settings (sometimes collectively referred to herein as a "browser policies") such as those discussed above. For example, the user interface may include menus, radio buttons, checkboxes, and/or sliders via which IT personnel select which browser features or functions are to be enabled or disabled, select which security features are to be enabled or disabled, which browser menu items are to be enabled or disabled, which browser menu items are to be displayed or not displayed, etc. Optionally, the administrative user interface may include fields configured to receive rules (e.g., in the form of a Boolean formula or otherwise), locators (e.g., URLs for blacklisting or whitelisting purposes), and/or names or file locators for files that store rules, browser configurations, and/or browser settings.

Further, a menu of user sets may be provided listing different classes or sets of users (or user devices associated with users), where a given set of rules, browser configurations, and/or browser settings may be applied to one or more specified sets. For example, users may be classified according to job function (e.g., manager, administrator, technical staff, security analyst, support staff, researcher, agent, etc.), employee type (full time, part time, contractor), length of employment (e.g., less than 3 months, less than 1 year, more than 1 year, etc.), level of training (e.g., did not receive browser security training, received basic browser security training, received advanced browser security training, etc.), what data stores the user has access to (e.g., does the user have access to customer data stores and sensitive customer information such as credit cards information and user passwords), what applications the user currently has open (e.g., applications that have access to sensitive customer information), and/or otherwise. The IT personnel, or other authorized person, may select one or more sets and select a specified set of rules, browser configurations, and browser settings to be applied to the selected sets. Users may be assigned to a given set manually by authorized personnel or users may be automatically assigned to a set based at least in part on metadata associated with the user (e.g., based on a user record that includes the user's title, employee type classification, job function descriptor, department name, length of employment, etc.).

By way of illustration, a set of blacklisted websites may be defined. The IT personnel may specify via an administrative user interface that manager browsers are permitted to access the blacklisted websites and that support staff are not permitted to access the blacklisted sites. By way of further example, IT personnel may specify via an administrative user interface that the browsers of researchers, managers, and administrators are permitted to download Word documents, and that browsers of customer service personnel and part time employees are not permitted to download Word documents.

With reference to an illustrative example, a user may cause a user device to load a software browser application (henceforth referred to as a "browser") for accessing content provided by one or more content providers. Illustratively, the content may include a collection of one or more network resources (e.g., a Web page) and embedded resources such as images, video, audio, text, executable code, and/or other resources. The browser may be configured to download executable and non-executable files from remote systems. The browser may have a content display area for displaying the accessed network content in addition to one or more local interface components, such as toolbars, menus, buttons, or other user interface controls. Certain local interface components may be selectively configured to be managed and controlled by the software browser application or any other process executing or implemented locally at the user device. Certain local interface components may be selectively configured to be managed and controlled by processes executing or implemented on the remote intermediate system in accordance with certain policies and rules, examples of which are discussed herein. Illustratively, managing certain user interface controls remotely may enable security policies and rules to be applied at a central location to a set of user devices rather than having to manage local browser installations on client terminals.

Subsequent to the browser being loaded, a user or automated browser process may cause the user device to transmit a request to access content from a content provider by establishing a browse session with a network computing and storage provider across a private or public network. The network computing and storage provider may host or access the enterprise browser administration system. The browse session request may include information identifying one or more sources for the requested content. The identifiers can be in the form of network addresses of network resources, such as a Web site or other network accessible piece of content. For example, the user may select or enter a URL, (e.g., http://www.xyzwebsite.com) into a browser window, causing the user device to transmit a request for a new browse session to the network computing and storage provider, including the selected URL. The address or location of a network computing and storage provider capable to service the browse session request may be hardcoded into the browser, may be configurable by the user, may be obtained from a network address service, or may be determined in any other way.

In an illustrative embodiment, responsive to the browse session request received from the user device, the network computing and storage provider may instantiate or cause to have instantiated one or more computing components associated with the network computing and storage provider that will host a browser software application. For example, the network computing and storage provider can instantiate, or cause to have instantiated, an instance of a virtual machine (e.g., a proxy server) that includes a software browser application capable of requesting resources from a communication network. Illustratively, in some situations, one or more devices associated with the network computing and storage provider may be located in a data center or other robustly networked computing environment, and, as compared to the user device, may experience relatively little latency or delay when obtaining network resources.

The network computing and storage provider may inspect, using the enterprise browser administration system, the browser request, identify to which set the user and/or client associated with the request belong, based on the identified set of users and/or clients identify the set of browser policies that apply to that set of users and/or clients, and then apply the set of browser policies to the browser request and other browser session activities.

By way of illustrative example, based on the set of browser policies the enterprise browser administration system may determine whether or not to request the identified network resource(s) from one or more content providers. If a determination is made that the network resource is to be requested, the enterprise browser administration system may analyze the associated resource content being returned and/or any certificates associated with the network resource, and determine whether to provide some or all of the content to the requesting browser, and whether to enable the requesting browser to perform certain actions with respect to the content. Of course other factors, such as those discussed above, may be taken into account in determining what resources may be requested, what content is to be returned to the user device, and what operations the user device browser is to perform with respect to the returned content.

By way of an illustrative example, the enterprise browser administration system (EBAS) may inspect the set of browser policies and determine whether the set of browser policies specifies that a blacklist of whitelist apply. If a blacklist applies, the enterprise browser administration system may compare the browser network resource request to the blacklist, and if the browser request matches a resource on the blacklist, the enterprise browser administration system will inhibit the network computing components from requesting the identified network resource, or the enterprise browser administration system may permit the identified resource to be requested, but prevent the content associated with the identified network resource from being provided to the requesting browser. In addition, if the browser request matches a resource on the blacklist, the network computing components may transmit a corresponding notification to the requesting browser or otherwise cause a notification to be presented via the requesting browser, where the notification informs the user that the user is not permitted to access the requested resource. Optionally, if the user's IT administrator has an override procedure to grant a given user access to a blocked resource, the notification may inform the user of the procedure and provide a user interface via which the user may submit a request to access the blocked resource in accordance with the override procedure. The override request may be processed by the EBAS and approved or disapproved. If the override request is approved, the network computing components may request the resource and forward the requested resource to the user browser.

If a whitelist is specified by the set of browser policies, the enterprise browser administration system may compare the browser network resource request to the whitelist, and if the browser request matches a resource on the blacklist, the enterprise browser administration system may permit the network computing components to request the identified network resource and to forward the network resource to the user browser.

By way of further example, the browser network resource request may be inspected by the enterprise browser administration system to determine if it appears to be a misspelling on another network resource (e.g., a misspelling of a popular Website's URL), and if so, the request of the network resource may be inhibited. By yet further example, other criteria may be used to determine whether a network resource request should be permitted. For example, if the request includes a domain name, a determination may be made whether it has been existence for less than a specified threshold of time (e.g., 2 months, 1 day, or other threshold), and if so, access of the domain may be inhibited.

If a determination is made that the identified network resource is to be requested, the network computing and storage provider, using the instantiated network computing components, may request the identified network resource(s) from one or more content providers, a content delivery network, or a local or associated cache component. For example, the browser software application on the instantiated network computing component can process a primary network resource and then generate additional content requests for content identified in one or more embedded resource identifiers (e.g. pictures, video files, etc.). Illustratively, in the case of other, non-browser, applications, network resources or content may include any file type or format known in the art and supported by the specific software application. Having obtained the requested content (e.g., the requested network resource and embedded resources), the enterprise browser administration system may examine the content and determine, based at least in part on the set of browser policies, which, if any content is to be provided to the requesting browser, and may further determine what actions the requesting browser may take with respect to the content.

For example, the enterprise browser administration system may determine, based on the set of browser policies for the requesting browser that cookies are not to be provided to the requesting browser and/or are not to be stored by the browser. By way of further example, the set of browser policies may specify the browser plugins may not be installed by the browser. The network computing components may pre-fetch and pre-render (e.g., virtually render) requested content (e.g., a webpage) and identify and filter out malware content as prohibited content. The network computing components will then inhibit the transmission of prohibited content to the requesting browser and/or inhibit certain browser actions with respect to content provided to the browser.

Having obtained the requested content (e.g., the requested network resource and embedded resources) and determined that some or all of the obtained requested content is to be provided to the requesting browser, the network computing and storage provider may identify a remote session browsing configuration specifying a remote session communication protocol for use in transmitting the requested content, user interaction data, intermediate processing results, browser settings, and other information between the browser being executed on the user device and the browser being executed at the instantiated network computing component on the computing and storage provider. The information exchanged between the browser on the instantiated network computing component and the browser on the user device can be generally referred to as "browser session information."

In addition to specifying a remote session communication protocol for transmitting information between the user device and the instantiated network computing component, the identified remote session browsing configuration may specify that one or more processing actions to be performed on the requested content are to be performed at the network computing and storage provider rather than, or in addition to, at the user device. The decision as to which processing actions are to be performed at the network computing and storage provider and which processing actions are to be performed at the user device may be based in part on the set of browser policies for the particular requesting browser or for the set associated with the requesting browser.

For purposes of illustration, the processing of network content by a browser may involve various processing actions before content can be rendered in an appropriate form on a user device. A Web page, for example, may be parsed and processed to process various HTML layout information and references to associated resources or embedded content such as CSS style sheets and JavaScript, as well as embedded content objects such as images, video, audio, etc. Each object or piece of code may be parsed and processed before a representative object model corresponding to the web page may be constructed and processed further for layout and display. In accordance with the selected remote session browsing configuration, the user device and the instantiated network computing component may exchange processing results via browser session information (e.g., state data or display data representing the requested content).

FIG. 1 illustrates an example network environment in which features can be implemented for processing content pages at an intermediary system and generating display commands for execution at a user device. The network environment shown in FIG. 1 includes various user devices 102, an intermediary system 104, and various content sources, including origin content servers 106 and content delivery network ("CDN") servers 108. The system components may communicate with each other via one or more communication networks 110. A network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

As will be appreciated by those of skill in the relevant art, a network environment may include any number of distinct user devices 102 and/or content sources 106, 108. In addition, multiple (e.g., two or more) intermediary systems 104 may be used. For example, separate intermediary systems 104 may be located so that they are close (in either a geographical or networking sense) to sets of current or potential user devices 102 or content sources 106, 108. In such a configuration, a user device 102 may request content via the intermediary system 104 to which it is closest, rather than all user devices 102 requesting content via a single intermediary system 104.

Optionally, in addition or instead, a user device 102, connected over the network 110 to the content sources 106, 108, may request content from content sources 106, 108 directly, without having the request traverse the intermediary system 104 hosting an enterprise browser administration and threat detection system 158 (e.g., without requiring the request to be first submitted to the intermediary system 104 so that the enterprise browser administration and threat detection system 158 can inspect the browser request, identify to which browser policies apply to the request or requester, and then apply the policies to the browser request, as discussed in greater detail elsewhere herein). The user device browser 120 may then optionally selectively submit requests to the threat detection system 158 for inspection of certain content and/or content sources.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Individual user devices 102 may execute a browser application 120 to communicate via the network 110 with other computing systems, such as the intermediary system 104 or content sources 106 and 108, in order to request and display content.

Illustratively, a user may use a browser application 120 to request network-accessible content (e.g., content pages, images, video, etc.) hosted or provided by a content source, such as an origin content server 106 or a CDN server 108.

The user device 102 or browser application 120 may be associated with the intermediary system 104 or otherwise configured to request the content through, and receive content display commands from, the intermediary system 104 rather than communicating directly with the content source. The browser application 120 may include a remote graphics module 122 that receives remotely-generated display commands, such as those generated by the intermediary system 104. The remote graphics module 122 (or some other module of the browser application 120) can execute the remote-generated display commands to display a representation of the requested content on the user device 102. Advantageously, the remote graphics module 122 may facilitate the display of graphical representations of requested content at the user device 102 without requiring the user device 102 to receive content files (e.g., HTML files, JPEG images, etc.) directly or indirectly from content sources 106 and 108.

In some embodiments, the browser 120 may be a conventional web browser that is not specifically designed or configured to execute remotely-generated graphics commands and other display commands. For example, the browser 120 may use or otherwise be associated with a remote graphics module 122 that is not integrated with the browser 120, such as a browser add-in or extension. In some embodiments, applications other than a browser 120 may include or use a remote graphics module 122 (or some similar module) to execute graphics commands generated by an intermediary system 104. For example, content aggregators or other specialized content display applications for mobile devices (e.g., Flipboard) may utilize a remote graphics module 122.

The intermediary system 104 can be a computing system configured to retrieve content on behalf of user devices 102 and generate display commands for execution by the user devices 102. For example, the intermediary system 104 can be a server or group of servers that may be accessed via the network 110. In some embodiments, the intermediary system 104 may be a proxy server, a system operated by an internet service provider (ISP), or some other device or group of devices that retrieve content on behalf of user devices 102.

The intermediary system 104 may include various modules, components, data stores, and the like to provide the content retrieval and processing functionality described herein. For example, the intermediary system 104 may include a server-based browser application or some other content rendering application to process content retrieved from content sources. Such a content rendering application may be referred to as a "headless browser" 140. Generally described, a headless browser 140 does not (or is not required to) cause display of content by a graphical display device of the server that on which the headless browser 140 is executing. Instead, the headless browser 140 comprises a browser engine and provides display commands to separate user devices 102. Illustratively, the headless browser 140 may obtain requested content from an origin content server 106 and/or CDN server 108, obtain additional items (e.g., images and executable code files) referenced by the requested content, execute code (e.g., JavaScript) that may be included in or referenced by the content, generate graphics commands to display a graphical representation of the content, and transmit the graphics commands to the user device 102. By performing some or all of these operations at the intermediary system 104, the substantial computing resources and high-speed network connections typically available to network-based server systems may be leveraged to perform the operations much more quickly than would otherwise be possible on a user device 102 with comparatively limited processing capability.

The headless browser 140 may include various modules to provide the functionality described above and in greater detail below. For example, the headless browser 140 may include: a content processing module 150 that parses content files and generates a document object model ("DOM") representation of the content; a graphics processing module 152 that receives the DOM representation and generates display commands (e.g., SKIA commands) to render a graphical representation of the content at a user device 102; and an interaction processing module 154 that communicates with the browser 120 to receive information regarding interactions with the content at the user device 102 and to update the graphical representation of the content if necessary. In some embodiments, a headless browser 140 may include additional or fewer modules than those shown in FIG. 1.

The intermediary system 104 may include an enterprise browser administration and threat detection system 158, which may inspect a browser request, identify to which set the user and/or client associated with the request belong, based on the identified set identify the set of browser policies that apply to that set of users and/or clients, and then apply the security configuration to the browser request and other browser session activities.

The intermediary system 104 may include additional modules, components, data stores, and the like to provide the features described above and in greater detail below. For example, the intermediary system 104 may include a cache 142 that stores content items received form content sources 106 and 108, graphics commands generated by the headless browser 140, and the like. The intermediary system 104 may also include a logged user behaviors data store 144 that stores information about user requests and user/user browser 120 interactions with content (e.g., to identify any adverse results of such interaction).

Because the intermediary system 104 may be processing requests and responses on behalf of an entire enterprise or multiple enterprises, the intermediary system 104 will have a voluminous amount of historical data related to such requests and associated responses stored in data store 144. Such historical, crowd sourced data may be used to identify patterns and threats. For example, each time a request comprising a URL is received from a user browser at an enterprise, the intermediary system 104 may analyze the logged user behaviors data store 144 and determine if the URL has ever been previously been requested by a browser at the enterprise, and if not, the request may be identified as a potential risk request and processed in accordance with a specified policy. By way of further example, if the intermediary system 104 determines that a URL had not been requested prior to a specified date, and that suddenly (e.g., over a period of one hour or one day), thousands of requests including the URL are received, the URL may be identified as a high risk, and requests for that URL may be processed in accordance with a specified policy. By way of yet further example, if an adverse event was recorded as a result of a client browser accessing certain content, that event may be recorded, and other browsers may be inhibited from accessing such content.

Thus, even if malware accessed via a client browser adversely affects one client, the intermediary system 104 may use the historical data stored in the logged user behaviors data store 144 to prevent the spread of the malware to other clients. Further, certain types of malware are configured not to initiate any harmful action if the malware detects it is being executed in some type of a security environment, such as a detonation chamber or other dynamic execution environments configured to isolate potential malware for examination. Therefore, in contrast to certain embodiments described herein that use logged user behaviors data to stop or slow the spread of malware, conventional systems that merely rely on detonation chambers to detect malware will fail to identify and halt the spread of certain types of malware. However, optionally a detonation chamber or other dynamic execution environments configured to isolate potential malware for examination are included in the embodiments disclosed herein.

In certain cases, such as for privacy reasons, a user or enterprise may not want to share certain types of logged user behaviors data with other users or enterprises, even for the prevention of malware. Thus, the embodiments disclosed herein optionally enable a user or enterprise to specify via a user interface what type(s) of data (e.g., content, content URLs, content hashes, etc.) may or may not be shared with other users or enterprises and for what purpose(s), and such specifications may be stored in memory and used to share data accordingly. For example, some enterprises may be willing to share all accessed content and content URLs. Other enterprises may be willing to share hashes of content, but not the content or URLs. Some enterprises may be willing to share certain information with the intermediary system 104 for malware detection and remediation purposes, but not for other purposes or for other enterprises. Certain policies may specify that a given enterprise's logged user behaviors data may be used to identify, to other enterprises, domains associated with threats but that otherwise their logged user behaviors data is not to be shared, by way of further example.

As noted above, optionally a user device 102 may request content from content sources 106, 108 directly, without having the request traverse the intermediary system 104. However, based on certain rules, the browser 120 may selectively submit content, such as embedded content received from content sources 106, 108, or a link to such content, to the intermediary system 104 for inspection by the enterprise browser administration and threat detection system 158 to determine the likelihood that the content poses a threat (e.g., that the content comprises malware). The enterprise browser administration and threat detection system 158 may then inspect the content transmitted by the client browser 120 or accessed from a content link sent by the client browser 120.

For example, the enterprise browser administration and threat detection system 158 may, as appropriate, execute such content in a secure environment, or compare such content to known content threats to determine if there is a match (e.g., by generating a content hash and comparing it against content hashes of known threats from logged user behaviors data store 144), and thereby determine the likelihood of the content being a threat (e.g., determine the likelihood that the content is malware, such as a rootkit, a virus, ransomware, spyware, adware, or other such items). In indicating the likelihood that content is a threat, content may simply be designated as a "threat" or as "no threat", or the indication may be in the form of a sliding scale or score (e.g., "high risk of threat", "medium risk of threat", "low risk of threat", or "90% likelihood content is a threat," "50% likelihood content is a threat," "10% likelihood content is a threat,"). The browser administration and threat detection system 158 may then transmit an indication to the client browser 120 as to the likelihood that the content is a threat.

The client browser 120 may then process the content accordingly in accordance with browser rules (e.g., not execute content that is a high or medium risk of threat).

Optionally, a control may be provided via the client browser 120 which enables or disables the transmission, by the browser 120, of content or content links or other content locators to the enterprise browser administration and threat detection system 158. For example, a user may not want to send content or content links to the enterprise browser administration and threat detection system 158 for privacy reasons.

Optionally, the browser 120 may have rules that determine, at least in part, which content should be submitted for inspection to the browser administration and threat detection system 158. For example, the browser 120 may include rules that indicate that non-executable files, such as JPEG files (which are typically of low risk), do not need to be submitted to the browser administration and threat detection system 158, while executable files (which are typically of higher risk) do need to be submitted browser administration and threat detection system 158 for inspection. Other criteria that may be used in determining whether or not to forward content to the enterprise browser administration and threat detection system 158 for inspection may be the processing power needed to determine whether the content is a risk, or whether the historical data stored in the logged user behaviors data store 144 may be helpful in determining the risk level of the content.

The intermediary system 104 may be a single computing device, or it may include multiple distinct computing devices, such as computer servers, logically or physically grouped together to collectively operate as an intermediary system. The components of the intermediary system 104 can each be implemented as hardware, such as a server computing device, or as a combination of hardware and software. In addition, the modules and components of the intermediary system 104 can be combined on one server computing device or separated individually or into groups on several server computing devices. In some embodiments, the intermediary system 104 may include additional or fewer components than illustrated in FIG. 1.

In some embodiments, the features and services provided by the intermediary system 104 may be implemented as web services consumable via the communication network 110. In further embodiments, the intermediary system 104 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The origin content servers 106 and CDN servers 108 can correspond to logical associations of one or more computing devices for hosting content and servicing requests for the hosted content over the network 110. For example, a content server 106 or CDN server 108 can include a web server component corresponding to one or more server computing devices for obtaining and processing requests for content (such as content pages) from user devices 102, the intermediary system 104, or other devices or service providers. In some embodiments, one or more content servers 106 may be associated one or more CDN service providers (e.g., entities that manage multiple CDN servers 108), application service providers, etc.

Figure 2:
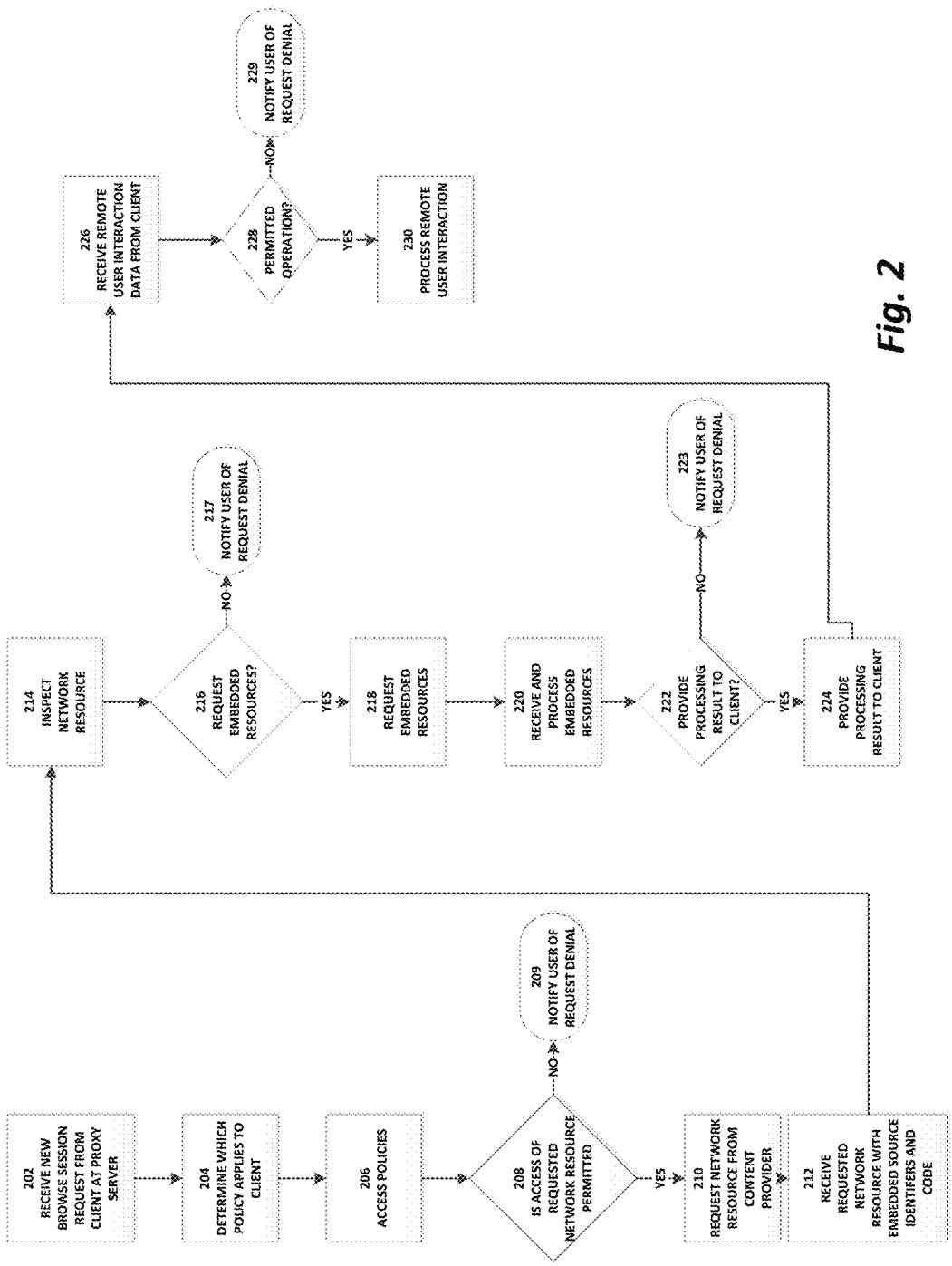
FIG. 2 illustrates an example process by which a policy is applied to a client resource request, according to one embodiment.

With reference now to FIG. 2, an example process is illustrated, illustrating the processing of network resource requests from a client, such as a user browser, including the application of browser policies. The process can begin at block 202 with the receipt at intermediary system (e.g., hosting a proxy server) of a browse session request from a user device. From the perspective of the user of the user device, the request for the new browse session corresponds to an intended request to transmit the request to one or more corresponding content providers. Optionally, the intermediary system may utilize a registration application program interface ("API") to accept browse session requests from the user device. The browse session request can include a client and/or user identifier (also referred to as a requester identifier) and network address information corresponding to a requested network resource, which may be in any form, including, but not limited to, an Internet Protocol ("IP") address, a URL, a Media Access Control ("MAC") address, etc. Optionally, rather than receiving the requester identifier as part of the browse session request, the requester identifier may be stored on the user device, and the intermediary system may access the requester identifier from the user device after receiving the browse session request.

Subsequent to the receipt of the browse session request, the intermediary system may select an associated network computing component (hereinafter "NCC") point of presence (hereinafter "POP") to service the browse session request. The selection of the NCC POP may determine the processing and network resources available to the instantiated virtual machine. The selection of processing and network resources and the provisioning of software at the NCC POP instance may be done, at least in part, in order to enhance communication with content provider systems and user devices.

At block 204, the enterprise browser administration system may use the requester identifier to determine what policy set the requester belongs to. At block 206, the enterprise browser administration system may access the set of browser policies for the identified policy set of users/clients. As discussed above, the browser policies may include security rules. At block 208, the enterprise browser administration system may determine whether access to the requested resource is permitted based on the set of browser policies. As discussed above, the set of browser policies may specify various techniques, such as whitelists, blacklists, pattern matching, misspelling checking, checking for lack of proper certificate and/or website age, by way of example, that are to be used in determining whether access to a requested resource is permitted. By way of further example, certain types of requests, such as those passing certain credentials (e.g., corporate credentials) to a requested location external to the enterprise system, may be prohibited all together. If a determination is made that the client is not permitted to access the requested network resource, then at block 209, an access denial notification (e.g., a text message, graphic, or the like, such as in the form of a webpage notification) may be provided to the client user, and the requested network resource is not provided to the requesting user device browser.

If a determination is made at block 208 that access to the requested network resource is permitted, then at block 210 the resource is requested from the content provider system by the proxy server, optionally using the headless browser 140. For example, the selected intermediate system 104 may generate a browse session corresponding to the client browse session request and may provide the request for the network resource to a content provider system based on a network address included in the client browse session request. For example, a browse session request may include a URL for a Web page, such as "http://www.xyzsite.com/default.htm." The intermediate system 104 may resolve the URL to an IP address through a DNS resolver associated with the network computing and storage provider (not shown), and may request the Web page from the content provider system at the resolved IP address. In various embodiments, a network resource may be retrieved from any combination of content providers, content delivery network (hereinafter "CDN") servers, or caches associated with the network computing and storage provider. For example, the network computing and storage provider may check if a resource is stored in a local cache or in another server or service provider associated with the network computing and storage provider. If a network resource is stored in a local or associated location, the intermediate system 104 may retrieve the network resource from the local or associated location rather than from the third party content provider or CDN service provider. Illustratively, the intermediate system 104 may provide requests for any number of network resources as included in the browse session request, and may obtain these network resources from any number of different sources, sequentially or in parallel.

At block 212, the requested network resource is received from the content provider. In certain cases, the requested network resource may include embedded source identifiers and code (e.g., scripts). For example, a network resource such as a Web page may include embedded CSS style information and JavaScript as well as embedded resource identifiers to additional resources such as text, images, video, audio, animation, executable code, and other HTML, CSS, and JavaScript files.

At block 214, the enterprise browser administration system may inspect the returned network resource and the embedded resource identifiers and at block 216 may determine if the embedded resources are to be requested. If a determination is made that the embedded resources are not to be requested, then at block 217, an access denial notification (e.g., a text message, graphic, or the like, such as in the form of a webpage notification) may be provided to the client user, and the prohibited embedded resources are not provided to the requesting user device browser. If a determination is made that the embedded resources are to be requested, then at block 218 the embedded resources are requested by the proxy server using the headless browser 140.

For example, the intermediate system 104 may provide resource requests to one or more sources of content such as content server 106 or CDN server 108. The resource requests may correspond to embedded resources based on one or more embedded resource identifiers extracted from a requested network resource (e.g., a Web page). In various embodiments, embedded resources may be retrieved from any combination of content providers, CDN servers, or caches associated with the intermediate system 104. For example, the network computing and storage provider may check if an embedded resource is stored in a local cache or in another server or service provider associated with the intermediate system 104. If an embedded resource is stored in a local or associated location, the intermediate system 104 may retrieve the embedded resource from the local or associated location rather than the third party content provider or CDN. Illustratively, the intermediate system 104 may provide requests for any number of embedded resources referenced by a network resource, and may obtain these embedded resources from any number of different sources, sequentially or in parallel. At block 220, the requested resources are received, and the intermediate system 104 may process the resources and requested content. For example, the system 104 may execute, in a safe environment, executable files included in the resources and requested content.

At block 222, the enterprise browser administration system may inspect the returned embedded network resources and/or the results of processing the embedded network resources and execution of executable files, and based on the applicable set of policies, determine whether the embedded resources and/or the results of processing the embedded network resources are to be provided to the client. The inspection may include pre-processing and pre-rendering the embedded network resources using the headless browser 140 to determine whether the processing or rendering of the embedded network resources will result in a prohibited event. For example, a determination may be made as to whether the resources and requested content includes malware, such as a rootkit, a virus, ransomware, spyware, adware, or other such items. Such determination may be made by comparing information, such as a hash value or a signature, of a resource with that of known malware to determine if there is a matching hash value or signature, thereby indicating the resource is malware. If a determination is made that the embedded resources are not to be provided to the client, then at block 223, an access denial notification (e.g., a text message, graphic, or the like displayed by the browser, such as in the form of a webpage notification) may be provided to the client user and the prohibited embedded resources and/or results of the processing the prohibited embedded resources are not provided to the requesting user device browser.

If a determination is made that the embedded resources and/or results of processing the embedded resources are to be provided to the requesting user device browser, then at block 224 the request network resource (and permitted embedded resources) are returned to the requesting user device browser. It is understood that, optionally, permitted embedded resources may be provided to the requesting user device browser and prohibited embedded resources may not be provided to the requesting user device browser, or optionally, if there are any prohibited embedded resources, then none of the embedded resources are provided to the requesting user device browser.

At block 226, the proxy server may receive, via the headless browser 140, remote interaction data from the user device browser. For example, if the user activates a link in the returned content (e.g., in a webpage), the link activation data (e.g., a URL) will be received at the proxy server. By way of further example, if the user attempts to change a browser security setting, the setting change request will be received at the proxy server. At block 228, the enterprise browser administration system may inspect the interaction data and determine whether interaction is permitted by the applicable set of browser policies. If the interaction is permitted, then at block 230, the interaction is processed accordingly. If the interaction is not permitted, then at block 229, the user is notified of the request denial with respect to the interaction.

Figure 3:
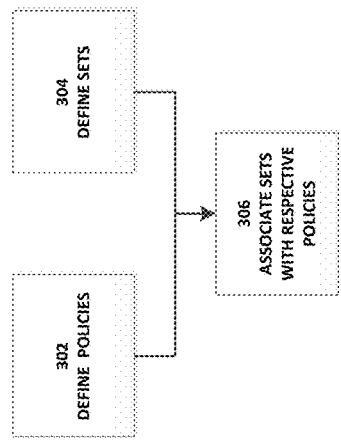
FIG. 3 illustrates an example process by which user/client sets and policies are defined, according to one embodiment.

FIG. 3 illustrates an example process by which sets and policies are defined, and by which a set of policies may be assigned to a set of users, user types, and/or client devices. At block 302, a user, such as an administrator with appropriate privileges, defines one or more policy sets. As similarly discussed elsewhere herein, a given set of policies may define rules, browser configurations, and/or browser settings. For example, the policies may specify how to process browser requests, what content may be provided to browsers, what actions such browsers may take with respect to returned content, what browser settings may be changed by an end user, and/or what browser controls are to be displayed to an end user, by way of example. At block 304, the administrator may define one or more sets of users, browsers, and/or user devices (sometimes referred to herein as a "user/client" set). As similarly discussed elsewhere herein, users may be classified by name, according to job function, employee type, length of employment, level of training, what data stores the user has access to, what applications the user currently has open, and/or otherwise. A user/client set definition may also specify which user devices are members of a user/client set, such as by specifying that user devices associated with particular unique user device identifiers or user devices assigned to a particular department or use are part of a user/client set. At block 306, the administrator may select one or more user/client sets and select a specified policy set to be applied to the selected sets.

Figure 4:
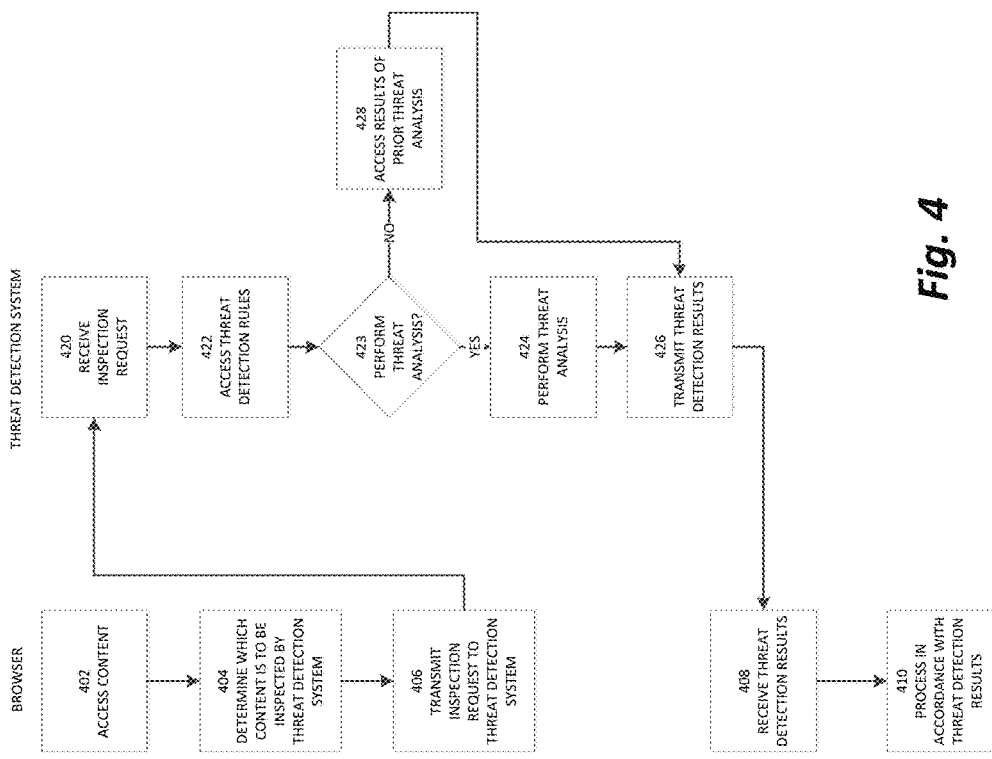
FIG. 4 illustrates an example process by which a user device browser submits content to a remote threat detection system for inspection, according to one embodiment.

FIG. 4 illustrates an example process by which a user device browser 120 submits content to a remote threat detection system 158 for inspection, according to one embodiment. At block 402, the user device browser 120 requests content from a content source, such as from content server 106. At state 404, the browser 120 determines which content from the content source is to be submitted to the threat detection system 158 for inspection. As similarly discussed above, the browser 120 may access rules that determine which content is to be submitted to the threat detection system 158 for inspection and/or which content is not to be submitted to the threat detection system 158 for inspection. For example, a rule may specify that all FLASH files are to be sent to the threat detection system 158 for inspection. By way of further example, a rule may specify that all video or video codec downloads are to be sent to the threat detection system 158 for inspection. By way of yet further example, a rule may specify that all content from a specific domain or top level domain (e.g., top level domains known to be associated with websites that are sources of malware) is to be sent to the threat detection system 158 for inspection. At block 406, based on the determinations made at block 404, the browser 120 transmits the corresponding content, links to the content, or other content locators, to the threat detection system 158 for inspection of the content.

At block 420, the threat detection system 158 receives the inspection request. At block 422, the threat detection system 158 accesses threat detection rules and criteria, such as discussed elsewhere herein. At block 423, the threat detection system 158 determines whether an analysis had previously been performed for the content. For example, the threat detection system 158 may generate a hash for the content and search through a data store of historical content threat analysis to determine if there is a matching hatch and an associated threat analysis that had been previously been performed using the threat detection rules and criteria from block 422. Optionally, the threat detection system 158 may only identify an historical threat analysis that is fairly recent, and so more likely to be reliable, and will filter out older, less reliable threat analysis and/or a threat analysis that was not performed using the threat detection rules and criteria from block 422. For example, a thirty day threshold may be set, wherein if the threat analysis is more than thirty days old it is considered stale and not to be relied upon. If a sufficiently recent historical threat analysis is located, then at block 428, the historical threat analysis is accessed, and at block 426, the threat detection system 158 transmits threat detection results from the historical threat analysis, such as content risk levels, to the browser 120.

If, at block 423, a sufficiently recent historical threat analysis is not located, at block 424, the threat detection system 158 applies the threat detection rules and criteria to the content from block 422 to identify levels of risks posed by the content (e.g., low risk, medium risk, high risk), as similarly discussed above (e.g., by comparing hash values of content with that of known malware, by executing executable files in a safe environment and reviewing the results, etc.). If the browser inspection request includes links or other locators associated with the content, rather than the content itself, the threat detection system 158 may access the content for inspection, using such links or other locators. At block 426, the threat detection system 158 transmits threat detection results, such as content risk levels, to the browser 120.

At block 408, the browser 120 receives the threat detection results from the threat detection system 158. At block 410, the browser 410 processes the content in accordance with the threat detection results. For example, if the threat detection results indicate a particular video download is high risk, the browser 120 will not download the video file.

Thus, as described above, methods and systems are provided that enable a user to efficiently administrate browsers on a user/client set basis.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method of detecting malware threats, the method comprising:

receiving over a network at a computer system from a first client browser, during a browsing session, a threat inspection request for a first item of content associated with a first webpage requested by the first client browser in accordance with configurable browser-based rules, the browser-based rules configured to selectively submit threat inspection requests, the first webpage comprising HTML layout information, the first item of content, associated with the first webpage, comprising embedded content received from a content source or a link in the first webpage to content, wherein the first client browser is hosted on a computing device remote from the computer system;

accessing, by the computer system, threat determination criteria; based at least in part on the accessed threat determination criteria, determining by the computer system a malware indicator associated with whether the first item of content comprising embedded content received from a content source or a link in the first webpage to content, associated with the threat inspection request from the first client browser, comprises malware, wherein determining by the computer system a malware indicator associated with whether the first item of content comprises malware comprises generating a content hash for the first item of content and comparing the generated content hash for the first item of content with content hashes of known threats; and transmitting by the computer system to the first client browser, from which the threat inspection request was received, the malware indicator, wherein the first client browser is configured to process the malware indicator.

2. The method as defined in claim 1, wherein the malware indicator comprises a threat score.

3. The method as defined in claim 1, wherein determining by the computer system a malware indicator, associated with whether the first item of content comprises malware, further comprises utilizing historical, crowd sourced data.

4. The method as defined in claim 1, wherein determining by the computer system a malware indicator associated with whether the first item of content comprises malware further comprises analyzing a change in frequency of requests for the first item of content.

5. The method of claim 1, wherein the client browser is configured to selectively request inspection of items of content based on one or more browser rules.

6. The method of claim 1, the method further comprising configuring, by the computer system, the client browser with one or more rules configured to utilize the information associated with the indicator associated with whether the first item of content comprises malware in determining how the browser is to process the first item of content.

7. The method of claim 1, wherein the client browser is configured to selectively request inspection of executable content and not to request inspection of non-executable content.

8. The method of claim 1, wherein the client browser is configured to selectively request inspection of items of content based at least in part on how much processing power is needed to determine whether a given item of content is a risk.

9. The method of claim 1, wherein the computing device remote from the computer system is a tablet computer.

10. A computer system, comprising:

a computer data repository that stores threat criteria, said computer data repository comprising a non-transitory storage device;

one or more computing devices, said computing system programmed to implement a threat detection system configured to:

receive a threat inspection request from a first client browser, during a browsing session, for a first item of content associated with a first webpage requested by the first client browser in accordance with configurable browser-based rules, the browser-based rules configured to selectively submit threat inspection requests, the first webpage comprising HTML layout information, wherein the first client browser is hosted on a networked computing device remote from the threat inspection system;

access threat determination criteria from the computer data repository;

based at least in part on the threat determination criteria, determine a malware indicator associated with whether the first item of content, associated with the threat inspection request from the first client browser, comprises malware, wherein determining a malware indicator associated with whether the first item of content comprises malware comprises generation of a content hash for the first item of content and comparison of the generated content hash for the first item of content with content hashes of known threats; and transmit the malware indicator to the first client browser from which the threat inspection request was received, wherein the first client browser is configured to process the malware indicator.

11. The computer system as defined in claim 10, wherein the malware indicator comprises a threat score.

12. The computer system as defined in claim 10, wherein the determination of a malware indicator, associated with whether the first item of content comprises malware, utilizes historical, crowd sourced data.

13. The computer system as defined in claim 10, wherein the determination of a malware indicator, associated with whether the first item of content comprises malware, is based at least in part on a detection of a change in frequency of requests for the first item of content.

14. The computer system as defined in claim 10, wherein the computer system is configured to configure the client browser with one or more rules configured to utilize the information associated with the indicator, associated with whether the first item of content comprises malware, in determining how the browser is to process the first item of content.

15. A computer storage system comprising a non-transitory storage device, said computer storage system having stored thereon executable program instructions that direct a computer system to at least:

receive a threat inspection request from a first client browser, during a browsing session, for a first item of content associated with a first webpage requested by the first client browser in accordance with configurable browser-based rules, the browser-based rules configured to selectively submit threat inspection requests, the first webpage comprising HTML layout information, wherein the first client browser is hosted on a networked computing device remote from the computer system; access threat determination criteria;

based at least in part on the threat determination criteria, determine malware indicator associated with whether the first item of content, associated with the threat inspection request from the first client browser, comprises malware, wherein determining a malware indicator associated with whether the first item of content comprises malware comprises generation of a content hash for the first item of content and comparison of the generated content hash for the first item of content with content hashes of known threats; and transmit the malware indicator to the first client browser, wherein the first client browser is configured to process the malware indicator.

16. The computer storage system as defined in claim 15, wherein the malware indicator comprises a threat score.

17. The computer storage system as defined in claim 15, wherein the determination of a malware indicator, associated with whether the first item of content comprises malware, utilizes historical, crowd sourced data.

* * * * *